United States Patent
Abd Elhamid et al.

(10) Patent No.: US 7,709,145 B2
(45) Date of Patent: May 4, 2010

(54) HYDROPHILIC SURFACE MODIFICATION OF BIPOLAR PLATE

(75) Inventors: Mahmoud H. Abd Elhamid, Grosse Point Woods, MI (US); Gayatri Vyas, Rochester Hills, MI (US); Yang-Tse Cheng, Rochester Hills, MI (US); Richard H. Blunk, Macomb Township, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 1011 days.

(21) Appl. No.: 10/987,609

(22) Filed: Nov. 12, 2004

(65) Prior Publication Data

US 2006/0105222 A1     May 18, 2006

(51) Int. Cl.
- H01M 6/48    (2006.01)
- H01M 10/18   (2006.01)
- H01M 8/00    (2006.01)
- H01M 2/00    (2006.01)
- H01M 2/02    (2006.01)

(52) U.S. Cl. .................. 429/210; 429/12; 429/34; 427/115

(58) Field of Classification Search ............ 429/12, 429/34, 38, 39, 210; 427/115
See application file for complete search history.

(56) References Cited

U.S. PATENT DOCUMENTS

| | | | |
|---|---|---|---|
| 4,175,165 A | 11/1979 | Adlhart | 429/30 |
| 4,506,035 A | 3/1985 | Barnett et al. | 521/53 |
| 5,480,735 A * | 1/1996 | Landsman et al. | 429/13 |
| 5,840,414 A * | 11/1998 | Bett et al. | 428/307.7 |
| 6,291,094 B1 | 9/2001 | Yoshimura et al. | 429/34 |
| 6,828,055 B2 * | 12/2004 | Kearl | 429/38 |
| 6,887,613 B2 * | 5/2005 | Lee et al. | 429/40 |
| 2003/0054221 A1 | 3/2003 | Saito et al. | 429/34 |

OTHER PUBLICATIONS

International Search Report dated Jul. 27, 2006 for PCT/US05/37173 filed Oct. 10, 2005 and corresponding to this application.

* cited by examiner

*Primary Examiner*—Patrick Ryan
*Assistant Examiner*—Julian Mercado

(57) ABSTRACT

A bipolar plate having hydrophilic surfaces is disclosed. The bipolar plate includes multiple surfaces including channels having channel surfaces. A hydrophilic coating is provided on the surfaces to enhance the water management capabilties of a fuel cell.

15 Claims, 1 Drawing Sheet

HYDROPHILIC SURFACE MODIFICATION OF BIPOLAR PLATE

FIELD OF THE INVENTION

The present invention relates to fuel cells which generate electricity to power vehicles or other machinery. More particularly, the present invention relates to bipolar plates having hydrophilic coatings and methods for rendering the surfaces of bipolar plates in a fuel cell hydrophilic to increase the wettability of the plates and enhance water management capabilities of the fuel cell.

BACKGROUND OF THE INVENTION

In recent years, much interest regarding fuel cell technology has developed due in large measures to fuel cell efficiency. Fuel cells have exhibited efficiencies as high as 55%. Furthermore, fuel cell power plants are environmentally-friendly, emitting only heat and water as by-products.

A PEM (polymer electrolyte membrane) fuel cell stack typically includes a central membrane electrode assembly (MEA) which is sandwiched between gas diffusion media. The MEA and gas diffusion media are sandwiched between a pair of bipolar plates. The bipolar plates are provided with flow field channels which conduct reactant gases to and product gases from the MEA through the gas diffusion media, as well as coolant channels which conduct coolant. The regions of the bipolar plate surface between the channels are known as lands and abut against the corresponding gas diffusion medium. It is desired that the surfaces of the bipolar plate, particularly the bipolar plate on the cathode side of the stack, be hydrophilic to facilitate optimum water management inside PEM fuel cell stacks.

Accordingly, bipolar plates having hydrophilic coatings and methods of rendering the surfaces of bipolar plates hydrophilic are needed to enhance water management in a PEM fuel cell stack.

SUMMARY OF THE INVENTION

The present invention is generally directed to bipolar plates having hydrophilic coatings and methods of providing hydrophilic coatings on bipolar plates, particularly on the cathode bipolar plate of a fuel cell stack. In one embodiment, the hydrophilic coating is a silicon dioxide. In another embodiment, the hydrophilic coating is a titanium oxide. In still another embodiment, the hydrophilic coating is silicon dioxide and titanium oxide. The hydrophilic coating enhances the wettability of the bipolar plate channel surfaces, thereby enhancing water management, performance, durability and efficiency of a fuel cell stack. During application of the coating to the bipolar plate using any of a variety of methods, a mask can be used to cover the lands of the bipolar plate to facilitate selective coating of the channel surfaces of the plate.

BRIEF DESCRIPTION OF THE DRAWINGS

The invention will now be described, by way of example, with reference to the accompanying drawings, in which.

DETAILED DESCRIPTION OF THE INVENTION

The present invention contemplates bipolar plates having hydrophilic coatings. In one embodiment, the hydrophilic coating is silicon dioxide. In another embodiment, the hydrophilic coating is titanium oxide. In still another embodiment, the hydrophilic coating is silicon dioxide and titanium oxide. The hydrophilic coating enhances the wettability of the bipolar plate channel surfaces, thereby enhancing the water management, performance, durability and efficiency of a fuel cell.

The invention further contemplates methods of providing hydrophilic coatings on bipolar plates, particularly on the cathode bipolar plate of a fuel cell stack. The methods include applying a silicon dioxide hydrophilic coating to surfaces, particularly the channel surfaces, of the bipolar plate using any of a variety of methods including but not limited to chemical vapor deposition, physical vapor deposition or plasma polymerization. The methods further include applying a titanium oxide hydrophilic coating to a bipolar plate using any of a variety of methods including but not limited to electrochemical methods, sputter deposition, chemical vapor deposition or reactive electron beam evaporation. The methods may further include applying both a silicon dioxide hydrophilic coating and a titanium oxide hydrophilic coating to the bipolar plate. During application of the coating to the bipolar plate, a mask can be used to cover the lands of the bipolar plate and facilitate selective coating of the channel surfaces of the plate; Subsequently, the lands can be coated with a thin layer of gold or a polymeric conductive carbon coating.

Silicon dioxide and titanium oxide have been shown to possess hydrophilic properties which could optimize the performance of bipolar plates. The spreading pressures of silicon dioxide and titanium oxide at 25 degrees C. are 336 and 300 dyne/$cm^2$, respectively. These high values for the spreading pressure indicate that silicon dioxide and titanium oxide have considerably high surface energy that make them promising candidates for hydrophilic surfaces on bipolar plates.

Figure 1:
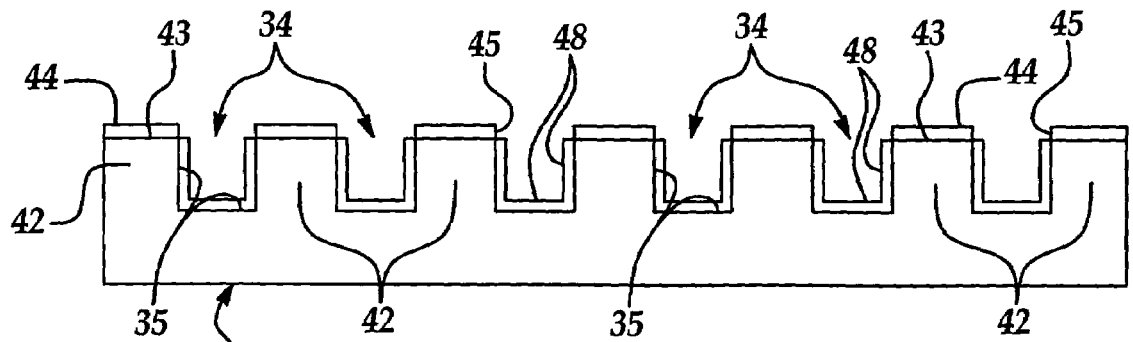
FIG. 1 is a cross-sectional view of a bipolar plate having a hydrophilic coating according to the present invention.

Referring to FIG. 1, a bipolar plate 32 having hydrophilic surfaces according to the present invention is shown. The bipolar plate 32 may be metal, such as stainless steel; a carbon composite; or any other material which is suitable for use as a bipolar plate in a fuel cell. The bipolar plate 32 is typically a cathode bipolar plate which is provided on the cathode side of a fuel cell stack, as will be hereinafter further described. The cathode bipolar plate 32 includes multiple channels 34 which distribute oxygen to and exhaust streams from the fuel cell stack. Coolant channels are provided on the back of this plate (not shown). Lands 42 having land surfaces 43 separate the channels 34 from each other. Each channel 34 has channel surfaces 35.

According to the present invention, a hydrophilic coating 48 is formed on the channel surfaces 35 of the channels 34. The hydrophilic coating 48 may be silicon dioxide, titanium oxide or both silicon dioxide and titanium oxide. Prior to application of the hydrophilic coating 48, which will be hereinafter described, a mask 44, having mask openings 45, is typically provided on the land surfaces 43 of the lands 42. The channel surfaces 35 of the channels 34 are exposed through the mask openings 45, whereas the land surfaces 43 are covered by the mask 44. This prevents the land surfaces 43 from being coated with the non-conductive oxide.

Figure 1A:
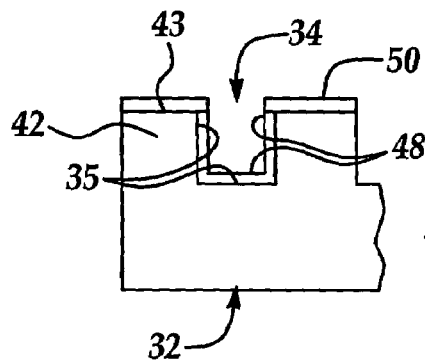
FIG. 1A is a cross-sectional view, partially in section, of a bipolar plate, illustrating a conductive coating provided on the land surfaces of the bipolar plate after application of the hydrophilic coating.

Referring next to FIG. 1A, after formation of the hydrophilic coating 48, which may be silicon dioxide, titanium oxide, or both, on the channel surfaces 35, the mask 44 is removed from the land surfaces 43. A conductive coating 50 can be formed on the land surfaces 43 to enhance electrical conductivity of the lands 42. In the case of a composite carbon bipolar plate 32, the conductive coating may not be required and the plates may be used as such. In the case of a stainless steel bipolar plate 32, the conductive coating 50 is typically a thin layer of Au or conductive polymeric coating. Therefore, the hydrophilic coating 48 increases the hydrophilicity of the channel surfaces 35 without impacting the coating conductivity of the lands 42.

In one embodiment, the silicon dioxide hydrophilic coating 48 is formed on the channel surfaces 35 using a conventional chemical vapor deposition (CVD) process or atomic layer deposition (ALD) process. The deposition temperature for the carbon composite bipolar plate 32 is typically about 200 degrees C. and for the stainless steel bipolar plate 32 is typically about 350 degrees C. Prior to the deposition process, the bipolar plate 32 is cleaned typically by exposure to far-UV radiation, which generates ozone and removes any organic contamination from the bipolar plate 32 by oxidation. Each cycle of the ALD process includes a dose of trimethylaluminum (TMA), followed by a dose of tris (tert-pentoxy) silanol. The thickness of the silicon dioxide hydrophilic coating 48 is typically about 10~50 nm, and the contact angle of the coating 48 is typically about 10~14 degrees.

In another embodiment, the silicon dioxide hydrophilic coating 48 is formed on the channel surfaces 35 by physical vapor deposition (PVD). In this method, magnetron sputtering is used to deposit the coating 48 at a BIAS potential of typically about 200 V in a reactive environment of $O_2$/Ar mixture plasma and a chamber pressure of typically about $2.5 \times 10^{-4}$ Torr. The target used in the magnetron sputtering process is 99% pure Si. Witness coupons may be run with the bipolar plate substrate to obtain the composition and thickness of the $SiO_2$ hydrophilic coating 48. Hydrophilic coatings 48 having a thickness of typically about 100 nm may be obtained using this method.

In still another embodiment, the silicon dioxide hydrophilic coating 48 is formed by plasma polymerization using open air plasma technology with air as a feeder gas. Samples obtained using this process are hydrophilic with contact angles of typically about 10~15 degrees.

The titanium oxide hydrophilic coating 48 may be formed on the channel surfaces 35 using an electrochemical plating (ECP) technique. This method involves the use of a 0.5 M sulfuric acid solution, with a stainless steel bipolar plate 32 as the cathode and titanium coupons as the anode. The titanium coupons are anodized for typically about 10 minutes at an applied potential of typically about 4, 6, 8, 10, 12, 14 and 16 volts, respectively. Contact angle values for the hydrophilic coating 48 are typically about 35~43. Alternative methods which may be used to form the titanium oxide hydrophilic coating 48 on the channel surfaces 35 include sputter deposition, chemical vapor deposition and reactive electron beam evaporation methods.

Figure 2:
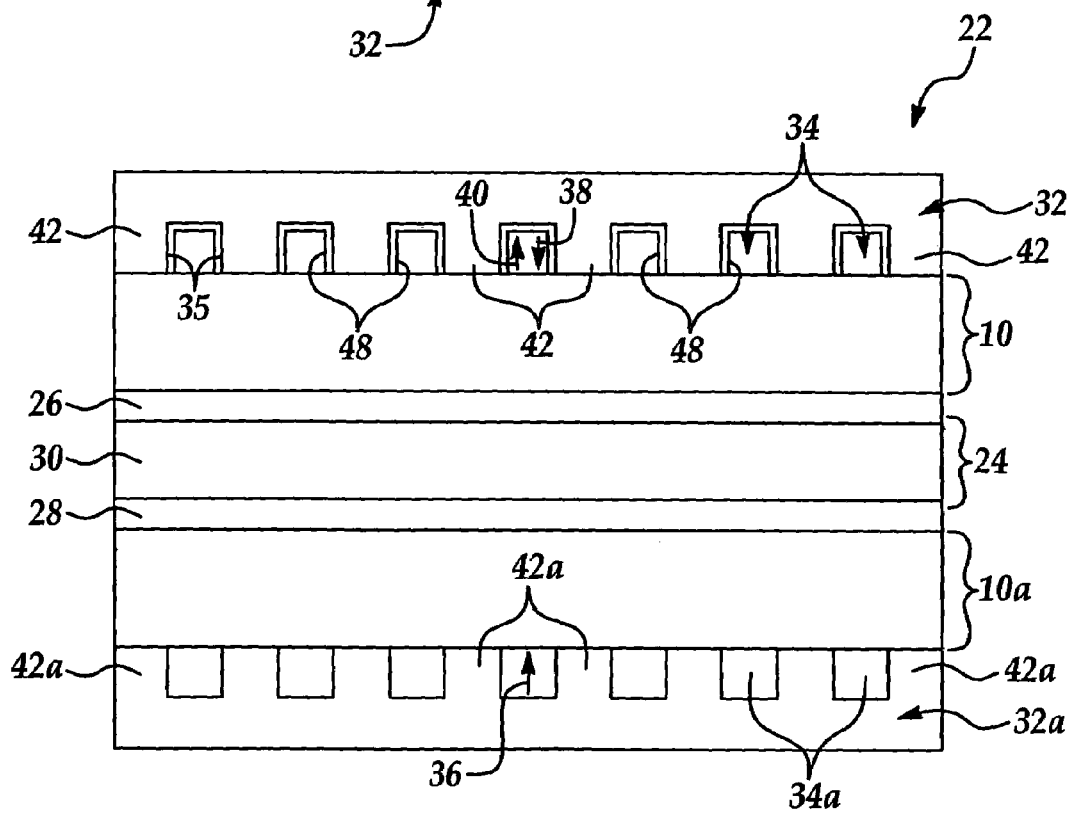
FIG. 2 is a cross-sectional view of a fuel cell stack which includes a bipolar plate with the hydrophilic coating of the present invention.

Referring next to FIG. 2, a fuel cell stack 22 is shown which includes the bipolar plate 32 having the hydrophilic coating 48 formed according to the present invention. The fuel cell stack 22 includes a membrane electrode assembly (MEA) 24 having a polymer electrolyte membrane (PEM) 30 which is sandwiched between a cathode 26 and an anode 28. A gas diffusion medium 10 is attached to or abuts against the cathode 26, and a gas diffusion medium 10a is attached to or abuts against the anode 28. The lands 42 of the bipolar plate 32 abut against the gas diffusion medium 10, whereas lands 42a of a bipolar plate 32a having multiple channels 34a abut against the gas diffusion medium 10a. Although not shown, a hydrophilic coating 48 may be formed on the surfaces of the channels 34a of the bipolar plate 32a in the same manner as was heretofore described with respect to the bipolar plate 32.

During operation of the fuel cell 22, hydrogen gas 36 flows through the channels 34a of the bipolar plate 32a and diffuses through the substrate 10a to the anode 28. In like manner, oxygen 38 flows through the channels 34 of the bipolar plate 32 and diffuses through the substrate 10 to the cathode 26. At the anode 28, the hydrogen 36 is split into electrons and protons. The electrons are distributed as electric current from the anode 28, through a drive motor (not shown) and then to the cathode 26. The protons migrate from the anode 28, through the PEM 30 to the cathode 26. At the cathode 26, the protons are combined with electrons returning from the drive motor and oxygen 38 to form water 40. The water 40 diffuses from the cathode 26, through the substrate 10 into the channels 34 of the bipolar plate 32 and is discharged from the fuel cell stack 22.

In the fuel cell stack 22, the polymer electrode membrane 30 requires a certain level of humidity. Irreversible damage to the fuel cell 22 will occur if the membrane 30 dries out. Therefore, maintenance of humidity in the membrane 30, through humidity/water management, is very important for proper functioning of the fuel cell 22. Accordingly, the hydrophilic coating 48 enhances the wettability of the bipolar plate channel surfaces 35 of the bipolar plate 32, thereby enhancing water management, performance, durability and efficiency of the fuel cell stack 22.

For proper functioning of fuel cell, it is required that the water generated does not create any flooding problems. Accumulation of water in the channels 34 can create mass transport limitation because of the limited solubility of oxygen in water. Such accumulation can cause the cell to perform poorly because of the reactant starve to eventually effect the performance of fuel cell.

While the preferred embodiments of the invention have been described above, it will be recognized and understood that various modifications can be made in the invention and the appended claims are intended to cover all such modifications which may fall within the spirit and scope of the invention.

What is claimed is:

1. A product comprising:
   a bipolar plate comprising:
   a plurality of channels having channel surfaces;
   a plurality of lands having land surfaces separating said plurality of channels;
   a layer of a conductive coating formed on said land surfaces; and
   a hydrophilic coating formed on said channel surfaces and not on the land surfaces.

2. The product of claim 1 wherein said hydrophilic coating comprises at least one of a silicon dioxide coating or a titanium oxide coating.

3. The product of claim 2 wherein said hydrophilic coating comprises a silicon dioxide coating and a titanium oxide coating.

4. The product of claim 2 wherein said hydrophilic coating comprises a silicon dioxide coating.

5. The product of claim 1 wherein said conductive coating comprises gold.

6. The product of claim 1 wherein said conductive coating comprises a conductive polymeric carbon coating.

7. The product of claim 1 further comprising a gas diffusion medium underlying the bipolar plate and an electrode underlying the gas diffusion media.

8. The product of claim 1 further comprising a gas diffusion medium underlying the bipolar plate and a membrane electrode assembly underlying the gas diffusion medium.

9. A method comprising:

providing hydrophilic surfaces on a bipolar plate, comprising:

providing a bipolar plate comprising a plurality of channels having channel surfaces and a plurality of lands having land surfaces separating said plurality of channels;

forming a layer of a conductive coating on said land surfaces; and forming a hydrophilic coating on said channel surfaces and not on the land surfaces.

10. The method of claim 9 wherein said hydrophilic coating comprises at least one of a silicon dioxide coating or a titanium oxide coating.

11. The method of claim 9 wherein said conductive coating comprises gold.

12. The method of claim 9 wherein said conductive coating comprises a conductive polymeric coating.

13. The method of claim 9 wherein said hydrophilic coating is formed on said channel surfaces using a technique comprising at least one of chemical vapor deposition, physical vapor deposition, plasma polymerization or electrochemical methods.

14. The method of claim 9 further comprising providing a gas diffusion media underlying the bipolar plate and an electrode underlying the gas diffusion media.

15. The method of claim 9 wherein said hydrophilic coating comprises a silicon dioxide coating.

* * * * *